United States Patent [19]

Takano et al.

[11] Patent Number: 4,691,649
[45] Date of Patent: Sep. 8, 1987

[54] INPUT DEVICE FOR SEWING MACHINE

[75] Inventors: Kunio Takano, Tokyo; Masanori Nukushina; Yoichi Okiyama, both of Kanagawa; Toshiyuki Miyamoto, Tokyo, all of Japan

[73] Assignee: Tokyo Juki Industrial Co., Ltd., Chofu, Japan

[21] Appl. No.: 758,657

[22] Filed: Jul. 24, 1985

[30] Foreign Application Priority Data

Jul. 31, 1984 [JP] Japan ................... 59-160781

[51] Int. Cl.$^4$ ........................................... D05B 21/00
[52] U.S. Cl. ............................. 112/121.12; 112/457
[58] Field of Search .................. 112/121.12, 121.11, 112/457, 456, 453, 266.1; 364/400, 470

[56] References Cited

U.S. PATENT DOCUMENTS

| | | | |
|---|---|---|---|
| 4,413,574 | 11/1983 | Hirota et al. | 112/457 X |
| 4,429,364 | 1/1984 | Maruyama et al. | 112/457 X |
| 4,446,520 | 5/1984 | Shigeta et al. | 112/457 X |
| 4,520,745 | 6/1985 | Shinomiya et al. | 112/121.12 X |
| 4,646,246 | 2/1987 | Kinoshita et al. | 364/470 |

FOREIGN PATENT DOCUMENTS

| | | | |
|---|---|---|---|
| 54-10632 | 1/1979 | Japan | 112/121.11 X |
| 55-38146 | 3/1980 | Japan | 112/121.12 |

Primary Examiner—Peter Nerbun
Attorney, Agent, or Firm—Tarolli, Sundheim & Covell

[57] ABSTRACT

An input device for sewing machines comprising a means for making visible the sewing pattern up to the inflection point immediately followed by the inflection point to be modified to facilitate the modification of the sewing pattern, a means for inputting the coordinate data of the inflection point to be modified, a means for indicating the contents of the modification, and a means for operating the contents of the modification thus indicated under a predetermined control.

4 Claims, 9 Drawing Figures

Fig. 3(a) Fig. 3(b) Fig. 3(c)
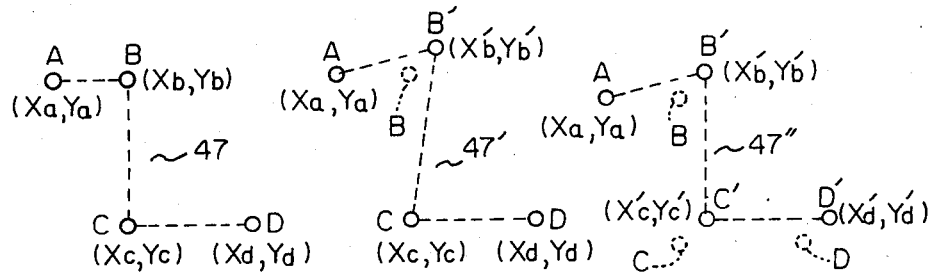
Fig. 4(a) Fig. 4(b)
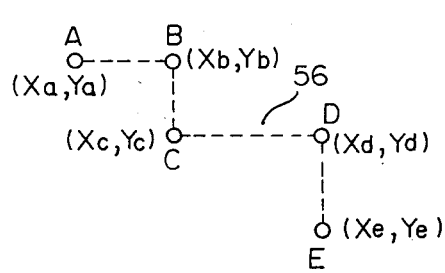 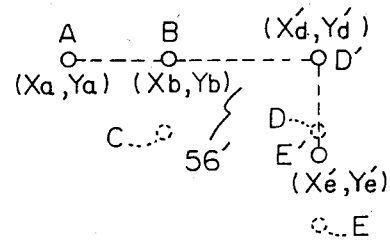
Fig. 5(a) Fig. 5(b)
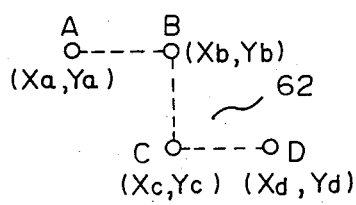 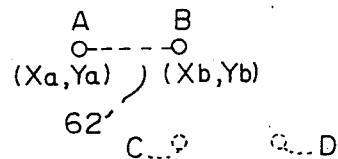

INPUT DEVICE FOR SEWING MACHINE

BACKGROUND OF THE INVENTION

This invention relates to an input device for sewing machines which performs program control of sewing patterns, and more particularly, to an input device by which sewing patterns being prepared can be modified.

A sewing machine has heretofore been known which performs a sewing in a desired pattern by moving a work holder for supporting a workpiece by a pulse motor in accordance with coordinate date which has previously been stored as data corresponding to the desired sewing pattern in a memory device such as magnetic tape, magnetic card, and floppy. As an input device for this type of sewing machine there has been known an input device which inputs inflection points of sewing pattern to a digitizer (graph drawing apparatus) by means of indicating pen to prepare sewing patterns. The term "inflection point" as used herein means a point representing the contour of graphs. A straight line is represented by two inflection points, i.e. one end and the other end thereof. A circular arc is represented by three inflection points, i.e. one end, the other end, and a point on the arc therebetween. When points are inputted, the points themselves are inflection points. In the prior art input device of this type, the modification of a sewing pattern being prepared requires removal of every point to be eliminated or requires a new start for the newly desired pattern. This disadvantageously requires a considerable long period of time for the preparation of a desired pattern, complicates the operation, and makes it impossible to prepare a pattern conforming to the sewing machine.

SUMMARY OF THE INVENTION

It is therefore an object of the invention to provide an input device by which modification of a sewing pattern can be easily performed during preparation of the sewing pattern, the efficiency of preparation of a sewing pattern can be significantly improved, and the preparation of an accurate pattern can be assured.

The present invention provides a means for indicating modification of a sewing pattern, a means for enabling the view of inflection points which are about to be modified, a means for inputting correct coordinates points, and a means for exccecuting the operation for modifying the sewing pattern in accordance with the indication from the indicating means.

Thus, the present invention is effective in that it easily enables modification of sewing patterns during the preparation of a sewing pattern, that it can significantly improve the efficiency of preparation of a sewing pattern, and in that it enables preparation of an accurate sewing pattern suitable for the sewing machine.

BRIEF DESCRIPTION OF THE DRAWINGS

FIGS. 3(a), 3(b), 3(c), 4(a), 4(b), 5(a) and 5(b) show the operation of an embodiment of the invention.

DETAILED DESCRIPTION OF THE PREFERRED EMBODIMENT

Figure 1:
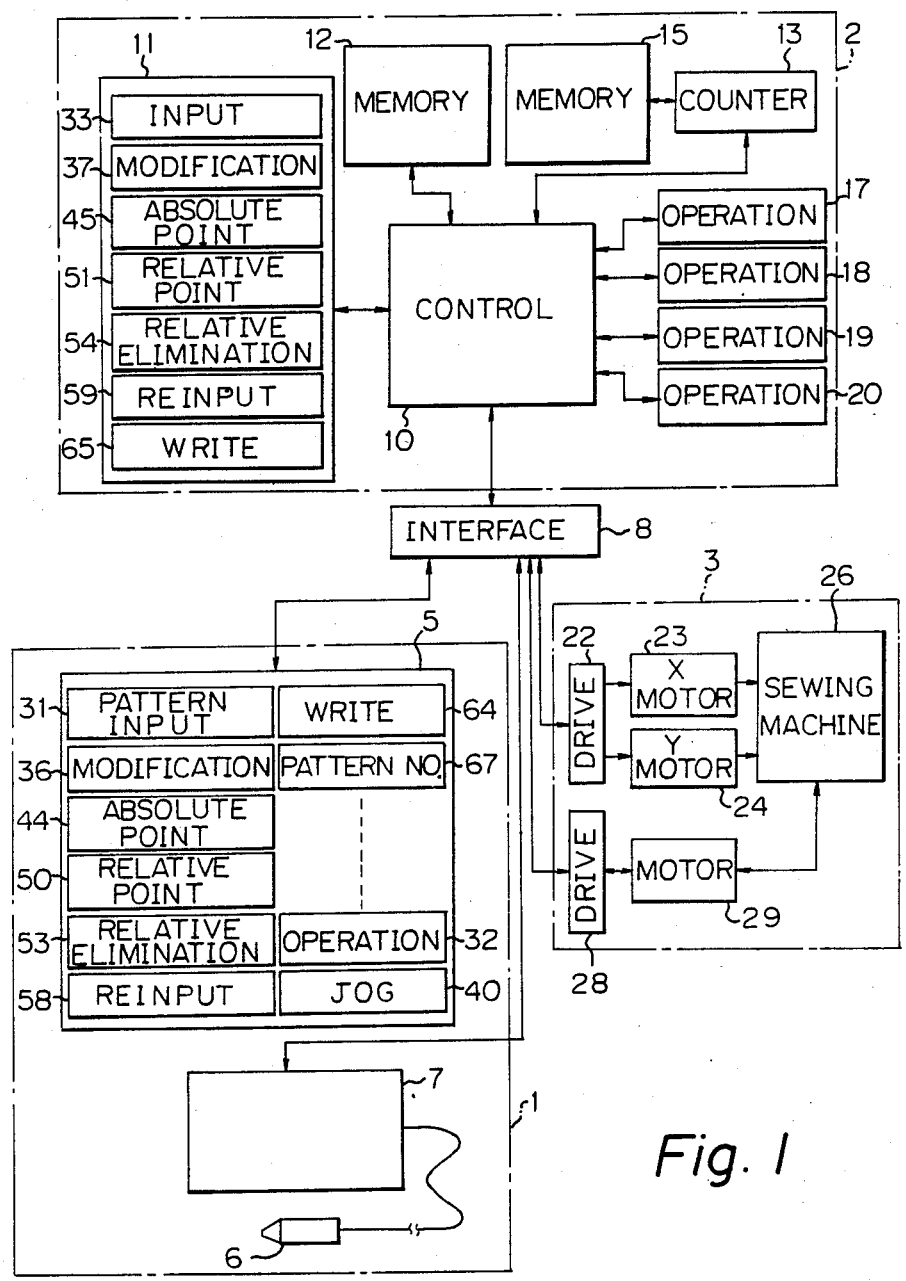
FIG. 1 is a block diagram of essential parts of an embodiment of the invention.

An embodiment of the invention will be described hereinafter referring to the drawings. FIG. 1 shows a block diagram of essential parts of the embodiment of the invention. FIG. 1 is mainly composed of an input portion 1, control portion 2 and sewing machine drive portion 3. In particular, a digitizer 7 has a console 5 and an indicating pen 6 connected to a control circuit 10 in the control portion 2 via an interface circuit 8. A read only memory (ROM) circuit 11 in which various programs are stored and a writable memory circuit 12 for storing sewing patterns are connected to the control circuit 10. A writable memory circuit (RAM) 15 is connected to the control circuit 10 via an address counter 13. Furthermore, operation circuits 17, 18, 19 and 20 are connected to the control circuit 10. Moreover, a drive circuit 22 is connected to the control circuit 10 via the interface circuit 8. The drive circuit 22 in turn is connected to a pulse motor 23 for moving a work holder in an X-axis direction and a pulse motor 24 for moving the work holder in a Y-axis direction. The output of the pulse motors 23 and 24 are connected to a sewing mechanism 26. Also connected to the control circuit 10 via the interface circuit 8 is a drive circuit 28 which in turn is connected to a motor 29 for driving the sewing mechanism. The output of the motor 29 is connected to the sewing mechanism 26.

Figure 2:
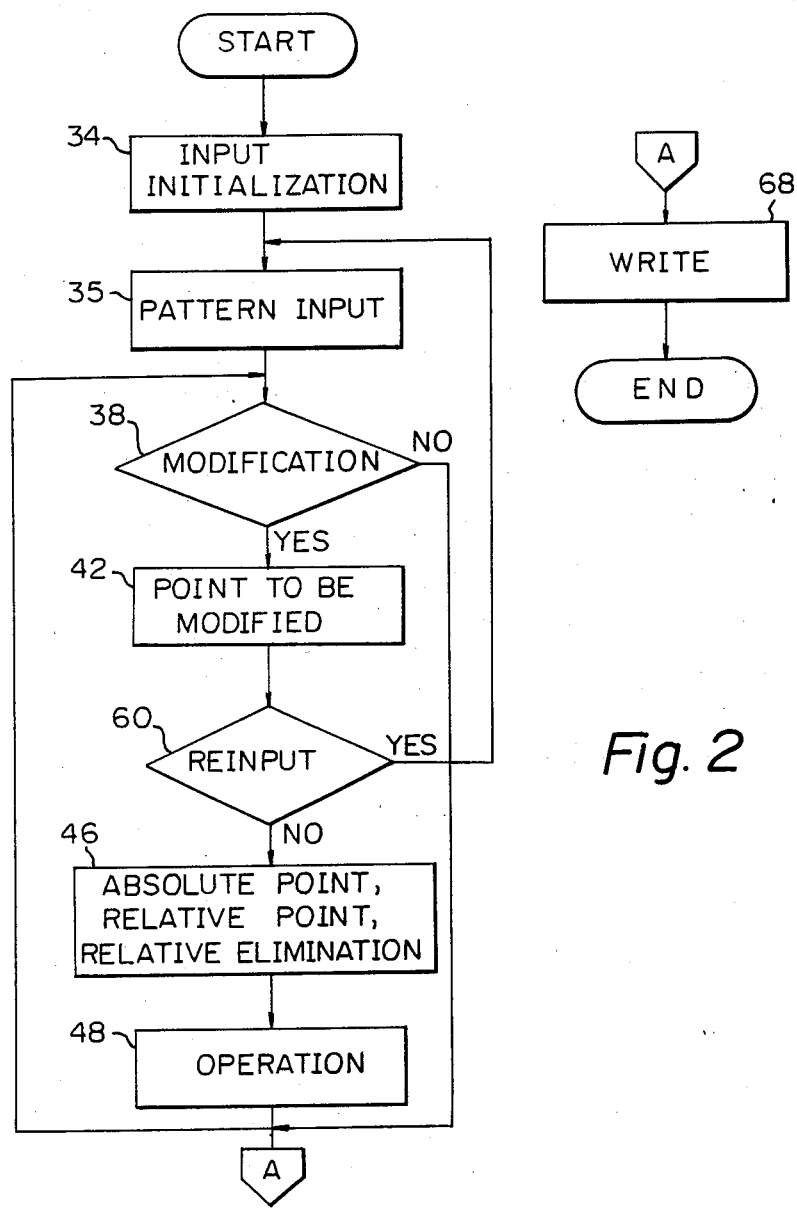
FIG. 2 is a flow chart of an embodiment of the invention.

FIG. 2 shows a flow chart of FIG. 1. FIGS. 3(a), 3(b), 3(c), 4(a), 4(b), 5(a) and 5(b) each shows the operation of the embodiment of FIG. 1.

In operation, a pattern input key 31 and an operation key 32 on the console 5 are operated. This causes the control circuit 10 to select an input mode 33 from the memory circuit 11. First, an initialization is conducted to determine the scale of reduction of and the original point of the pattern and if reversion hold is needed or not (block 34 of FIG. 2). With such an arrangement, a sewing pattern is drawn on the digitizer with an indicating pen in a normal manner. This causes the control circuit 10 to produce coordinate data corresponding to the sewing pattern and the coordinate data in turn is stored in the memory circuit 15 (block 35 of FIG. 2). When the sewing pattern thus prepared needs to be modified, a modification key 36 and the operation key 32 are operated and a modification mode 37 is selected. This enables the control circuit 10 to operate in a modification mode (block 38 of FIG. 2). With such an arrangement, a JOG key 40 for incrementing the address counter 13 which indicates the address of the memory circuit 15 is operated to access the address of the memory circuit 15 in sequence so that coordinate data of the sewing pattern are read in sequence. The work holder is moved to every inflection point in accordance with the coordinate data thus read. The above operation is conducted to the inflection point immediately before the inflection point to be modified (block 42 of FIG. 2). This causes the inflection point immediately before the inflection point to be modified to be indicated and made visible to the operator.

The contents of the modification is then inputted by the operation key. If the modification of only an inflection point to be modified is modified, an absolute point modification key 44 and the operation key 32 are operated to select and exccecute an absolute point modification mode (block 46 of FIG. 2). A right angle stitch written into the program may not be accurately reproduced depending on the material to be sewn (leather, cloth, etc.) or the difference between machines (play). In this case, a program suited to the sewing machine used is needed. Therefore, the above absolute point modification is effective. This operation is described hereinafter referring to FIGS. 3(a) and 3(b). FIG. 3(a) shows a sewing pattern 47 having inflection points A, B, C and D. The letters in the parentheses show coordinate data. Referring to the case where the inflection point B is to be subjected to absolute point modification so that it is moved to an inflection point B' as shown in FIG. 3(b), the inflection point B' is drawn on the digitizer 7 by means of the indicating pen 6. This causes the coordinate data (Xb', Yb') of the inflection point B' to be inputted into the control circuit 10. In this absolute point modification mode 45, only the coordinate data of the inflection point B to be modified is modified. The control circuit 10 reads the coordinate data of the inflection points A and C of the sewing pattern 47 from the memory circuit 15 and causes the operation circuit 17 to perform an operation of modifying the relative coordinate data of each of the sewing points between A and B' between B' and C (block 48 of FIG. 2). Consequently, the sewing pattern 47 is modified into a sewing pattern 47'.

If the inflection points immediately after the inflection point to be modified are to be subjected to relative modification, a relative point modification key 50 is operated to select a relative point modification mode 51 (block 46 of FIG. 2).

The relative point modification is effective, for example, when a desired sewing accuracy cannot be achieved along a certain distance from the edge of the material to be sewn due to failure in the construction of pattern inputted into the program or the characteristics of the machine.

This operation is described hereinafter referring to FIGS. 3(a) and 3(c). When the inflection point B (Xb, Yb) is modified into the inflection point B' (X'b, Y'b), the coordinate data variations ($\Delta X = X'b - Xb$ and $\Delta Y = Y'b - Yb$) produced by the modification are added to the inflection points C and D following immediately after the inflection point B, respectively, in the operation circuit 18 (block 48 of FIG. 2). That is, the inflection points C and D are subjected to relative point modification with the relationship between B and C and between C and D maintained. The control circuit 10 reads the coordinate data (Xa, Ya) of the inflection point A from the memory circuit 15 and causes the operation circuit 18 to execute an operation of modifying the relative coordinate data of each of the sewing points between A and B' (block 48 of FIG. 2). Consequently, a sewing pattern 47" is produced.

If an inflection point is to be eliminated but maintaining the relationship between the inflection points following immediately after the eliminated inflection point, a relative elimination key 53 is operated to select a relative elimination mode 54 (block 46 of FIG. 2). This relative elimination is effective when various patterns having different shapes are prepared from one pattern.

This operation is described hereinafter referring to FIGS. 4(a) and 4(b). FIG. 4(a) shows a sewing pattern having inflection point A, B, C, D and E. The letters in parentheses show coordinate data. Referring to the case where an inflection point C (Xc, Yc) in FIG. 4(a) is subjected to relative elimination, the inflection point C to be eliminated is indicated on the digitizer 7 by means of the indicating pen 6. In the relative elimination mode 54, the control circuit 10 stores the inflection point C thus indicated as data of the inflection point to be subjected to relative elimination. This causes the operation circuit 19 to calculate variations ($\Delta X = Xc - Xb$ and $\Delta Y = Y - Yb$) of coordinate data between B and C (block 48 of FIG. 2). These variations $\Delta X$ and $\Delta Y$ are added to the coordinate data of the inflection points D and E following immediately after the inflection point C (block 48 of FIG. 2). This causes the inflection points D and E to be modified into inflection points D' and E'. The control circuit 10 removes the data of the pattern between B and C from the memory circuit 15 and writes the data of the inflection points D' and E' into the memory circuit 15 as the data following inflection point B. At this time, the relative coordinate data of sewing points between C and D are written as the relative coordinate data of sewing points between B and D'. Furthermore, the relative coordinate data of sewing points between D and E are written as the relative coordinate data of sewing points between D' and E'. Consequently, the sewing pattern is modified into a sewing pattern 56' in which the inflection points D and E have been removed relative to the inflection point B.

If one inflection point along the line and subsequent points are to be eliminated, reinput key 58 is operated to select a reinput mode 59 (block 60 of FIG. 2).

The above reinput mode is effective when the program is correct up to a point along the pattern but the subsequent points need to be modified or when a plurality of pattern whose shapes are the same up to a certain point along the line are to be prepared.

This operation is described hereinafter referring to FIGS. 5(a) and 5(b). FIG. 5(a) shows a sewing pattern having inflection points A, B, C and D. The letters in parentheses show coordinate data. Referring to the case where the inflection point C in FIG. 5(a) is eliminated, the inflection point C to be eliminated is indicated on the digitizer 7 by means of the indicating pen 6. In the reinput mode 59, the control circuit 10 identifies and stores the inflection point C thus indicated as an inflection point to be reinputted. This causes the data of the inflection point B immediately followed by the inflection point C to be read from the memory circuit 15 and thereby causes all the data of the sewing pattern following the inflection point B to be eliminated. Consequently, the sewing pattern 62 is modified into a sewing pattern 62' in which only the pattern data between A and B are present. The operation automatically moves the pattern input 35 so that subsequent possible necessary pattern reinput is enabled.

Also, the above modification may be repeated a plurality of times.

Once the above sewing pattern modification is finished, a write key 64 is operated to select a write mode 65. A pattern number key 67 is operated to select a desired pattern number. and the operation key 32 is then operated. This causes the sewing pattern thus modified to be written into the address of the memory circuit 12 corresponding to the desired pattern number thus selected (block 68 of FIG. 2). In the embodiment illustrated, the memory circuit 12 comprises a floppy. The floppy is withdrawn from the input device and set in the read portion of the sewing machine to be used so that the data stored therein are read.

Although the invention has been described in its preferred form with a certain degree of particularity, it is understood that the present disclosure of the preferred form has been changed in the details of construction and the combination and arrangement of parts may be restored to without departing from the spirit and the scope of the invention as hereinafter claimed.

What is claimed is:

1. An apparatus for use with a sewing machine for and modifying a sewing pattern to be sewn on a workpiece, said apparatus comprising:

sewing pattern inputting means for inputting coordinate values of a sewing pattern to be sewn on the workpiece;

modification type indication means for indicating absolute point modification of an inflection point in the inputted sewing pattern;

first means for inputting coordinate values of a modification point to replace the coordinate values of the inflection point to be modified;

second means for making visible a portion of the sewing pattern by an inflection point immediately before the inflection point to be modified; and sewing pattern modification means for modifying relative coordinate values of each of the sewing points between the modification point and an inflection point immediately before the inflection point to be modified in accordance with coordinate values of the modification point and the inflection point immediately before the inflection point to be modified and for modifying the relative coordinate values of each of sewing points between the modification point and an inflection point immediately after the inflection point to be modified in accordance with coordinate values of the modification point and the inflection point immediately after the inflection point to be modified.

2. An apparatus for use with a sewing machine and for modifying a sewing pattern to be sewn on a workpiece, said apparatus comprising:

sewing pattern inputting means for inputting coordinate values of a sewing pattern to be sewn on the workpiece;

modification type indication means for indicating relative point modification for modifying an inflection point to be modified in the inputted sewing pattern whereby each of the inflection points after the inflection point to be modified maintains a relative relation between each of the inflection points;

first means for inputting coordinate values of a modification point to replace the coordinate values of the inflection point to be modified;

second means for making visible a portion of the sewing pattern by an inflection point immediately preceding said inflection point to be modified; and sewing pattern modification means for calculating coordinate value variations between the modification point and the inflection point to be modified and for modifying the coordinate values of each of the inflection points after the inflection point to be modified by adding the calculated coordinate value variations to each of the inflection points after the inflection to be modified and for modifying relative coordinate values of each of the sewing points between the modification point and the inflection point immediately preceding the inflection point to be modified in accordance with coordinate values of the modification point and the inflection point immediately preceding the inflection point to be modified.

3. Apparatus for use with a sewing machine and for modifying a sewing pattern to be sewn on a workpiece, said apparatus comprising:

sewing pattern inputting means for inputting coordinate values of a sewing pattern to be sewn on the workpiece;

modification type indication means for indicating an inflection point relative elimination mode for eliminating an inflection point in the inputted sewing pattern whereby each of the inflection points after the inflection point to be eliminated maintains a relative relation between each of the inflection points;

first means for inputting coordinate values of the inflection point to be eliminate as coordinate values of a relative elimination inflection point;

second means for making visible the sewing pattern by an inflection point immediately preceding the inflection point to be eliminated; and sewing pattern modification means for calculating coordinate value variation between the relative elimination inflection point and an inflection point immediately preceding the inflection point to be eliminated and for modifying coordinate values of each of inflection points after the inflection point to be eliminated by adding the calculated coordinate value variations to each of the inflection points after the inflection point to be eliminated and for eliminating coordinate values of each of the sewing points between the relative elimination inflection point and an inflection point immediately preceding the inflection point to be eliminated and coordinate values of the relative elimination inflection point and for modifying coordinate values of the modified inflection points as coordinate values of inflection points after the inflection point immediately preceding the inflection point to be eliminated.

4. An apparatus for use with a sewing machine and for modifying a sewing pattern to be sewn on a workpiece, said apparatus comprising:

sewing pattern inputting means for inputting coordinate values of a sewing pattern to be sewn on the workpiece;

modification type indication means for indicating a reinputted modification for eliminating an inflecting point to be eliminated in the inputted sewing pattern whereby a sewing pattern after an inflection point immediately preceding the inflection point to be eliminated is eliminated;

first means for inputting coordinate values of the inflection point to be eliminated;

second means for making visible the sewing pattern by the inflection point immediately preceding the inflection point to be eliminated; and sewing pattern modification means for eliminating the inputted sewing pattern after the inflection point immediately preceding the inflection point to be eliminated and enabling the reinput of the remaining sewing pattern.

* * * * *